(12) United States Patent
Vic et al.

(10) Patent No.: US 10,281,951 B2
(45) Date of Patent: May 7, 2019

(54) ELECTRONIC APPARATUS COMPRISING TWO CASING COUPLED TOGETHER WITH TWO-PARALLEL-AXIS HINGE

(71) Applicant: Toshiba Client Solutions CO., LTD., Koto-ku, Tokyo (JP)

(72) Inventors: Lin Vic, Taipei (TW); Chiu Brad, Taipei (TW); Lin Walter, Taipei (TW); Huang San, Taipei (TW); Minoru Enomoto, Tokyo (JP)

(73) Assignee: Toshiba Client Solutions Co., LTD., Tokyo (JP)

( * ) Notice: Subject to any disclaimer, the term of this patent is extended or adjusted under 35 U.S.C. 154(b) by 0 days.

(21) Appl. No.: 15/960,293

(22) Filed: Apr. 23, 2018

(65) Prior Publication Data

US 2018/0239394 A1    Aug. 23, 2018

Related U.S. Application Data

(62) Division of application No. 15/429,995, filed on Feb. 10, 2017, now abandoned.

(Continued)

(51) Int. Cl.
  *G06F 1/16*    (2006.01)
  *E05D 3/06*    (2006.01)
  (Continued)

(52) U.S. Cl.
  CPC ............. *G06F 1/1618* (2013.01); *E05D 3/06* (2013.01); *E05D 3/12* (2013.01); *E05D 3/122* (2013.01);
  (Continued)

(58) Field of Classification Search
  CPC .. E05D 3/06; E05D 3/12; E05D 3/122; E05D 11/00; E05D 11/0054; E05D 11/087; E05Y 2900/606; G06F 1/1681; G06F 1/1618; H04M 1/0216; H04M 1/022; H05K 5/0226; Y10T 16/547; Y10T 16/541; Y10T 16/5387; Y10T 16/540255
  (Continued)

(56) References Cited

U.S. PATENT DOCUMENTS

| 8,578,561 B2 * | 11/2013 | Chuang ................. G06F 1/1681 16/354 |
| 9,057,215 B1 * | 6/2015 | Horng ....................... E05D 3/12 |

(Continued)

FOREIGN PATENT DOCUMENTS

| JP | 2012-173878 A | 9/2012 |
| JP | 2013-104461 A | 5/2013 |

OTHER PUBLICATIONS

U.S. Appl. No. 15/429,995, filed Feb. 10, 2017 Non-Final Office Action dated Jan. 26, 2018.

*Primary Examiner* — William L Miller
(74) *Attorney, Agent, or Firm* — Rutan & Tucker, LLP

(57) ABSTRACT

According to one embodiment, an electronic apparatus includes a first casing, a second casing, and a hinge which couples them rotatably from a first state to a second state. The hinge includes a first shaft, a first rotation engaging portion, a second shaft, a second rotation engaging portion, a housing, and a transmission unit. The transmission unit links the first engaging portion and the second engaging portion and rotates them with respect to a rotation angle of the housing from the first state to the second state.

9 Claims, 16 Drawing Sheets

Related U.S. Application Data

(60) Provisional application No. 62/294,234, filed on Feb. 11, 2016.

(51) Int. Cl.
 *E05D 11/00* (2006.01)
 *E05D 3/12* (2006.01)
 *E05D 11/08* (2006.01)

(52) U.S. Cl.
 CPC .......... *E05D 11/00* (2013.01); *E05D 11/0054* (2013.01); *G06F 1/1681* (2013.01); *E05D 11/087* (2013.01); *E05Y 2900/606* (2013.01); *Y10T 16/547* (2015.01)

(58) Field of Classification Search
 USPC ............. 16/366, 354, 330, 303; 379/433.13; 455/575.3; 361/679.27
 See application file for complete search history.

(56) References Cited

U.S. PATENT DOCUMENTS

| | | | |
|---|---|---|---|
| 9,115,750 B2 | 8/2015 | Park | |
| 9,127,490 B2 | 9/2015 | Chen et al. | |
| 9,134,767 B2* | 9/2015 | Chen | G06F 1/1681 |
| 9,274,566 B1* | 3/2016 | Horng | G06F 1/1681 |
| 9,290,976 B1* | 3/2016 | Horng | G06F 1/1618 |
| 9,309,705 B2 | 4/2016 | Hsu et al. | |
| 9,310,849 B2 | 4/2016 | Hsu et al. | |
| 9,464,471 B1 | 10/2016 | Chen et al. | |
| 9,524,000 B2 | 12/2016 | Hsu et al. | |
| 9,547,342 B2* | 1/2017 | Horng | G06F 1/1681 |
| 9,606,578 B2 | 3/2017 | Yuan et al. | |
| 9,611,680 B2 | 4/2017 | Xu | |
| 2005/0050686 A1 | 3/2005 | Kurokawa | |
| 2012/0212924 A1 | 8/2012 | Nakajima | |
| 2014/0360296 A1* | 12/2014 | Hsu | G06F 1/1616 74/98 |
| 2015/0040353 A1* | 2/2015 | Chen | G06F 1/1681 16/366 |
| 2015/0159413 A1 | 6/2015 | Chen et al. | |
| 2015/0160695 A1* | 6/2015 | Su | E05D 3/12 16/366 |
| 2015/0173218 A1* | 6/2015 | Hsu | E05D 3/12 16/366 |
| 2015/0189777 A1* | 7/2015 | Hsu | H05K 5/0226 16/366 |
| 2015/0245510 A1* | 8/2015 | Hsu | H05K 5/0226 16/250 |
| 2015/0309541 A1* | 10/2015 | Horng | E05D 3/12 16/250 |
| 2016/0060927 A1 | 3/2016 | Xu | |
| 2017/0235337 A1* | 8/2017 | Vic | E05D 3/12 361/679.55 |

\* cited by examiner

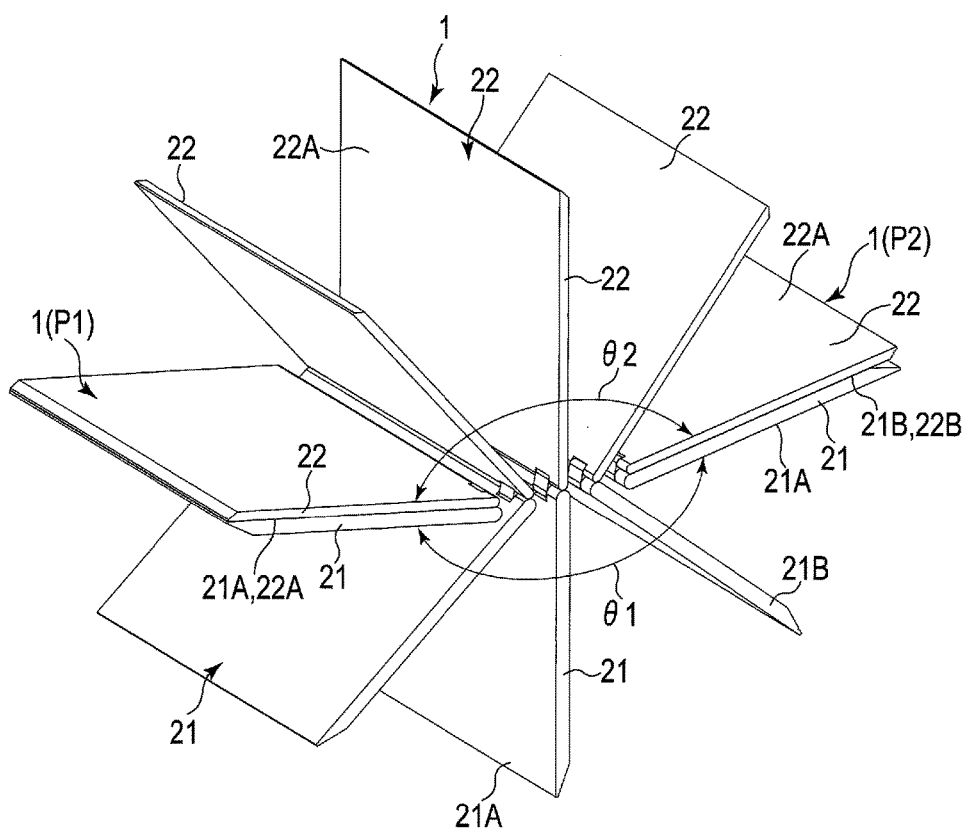
F I G. 7

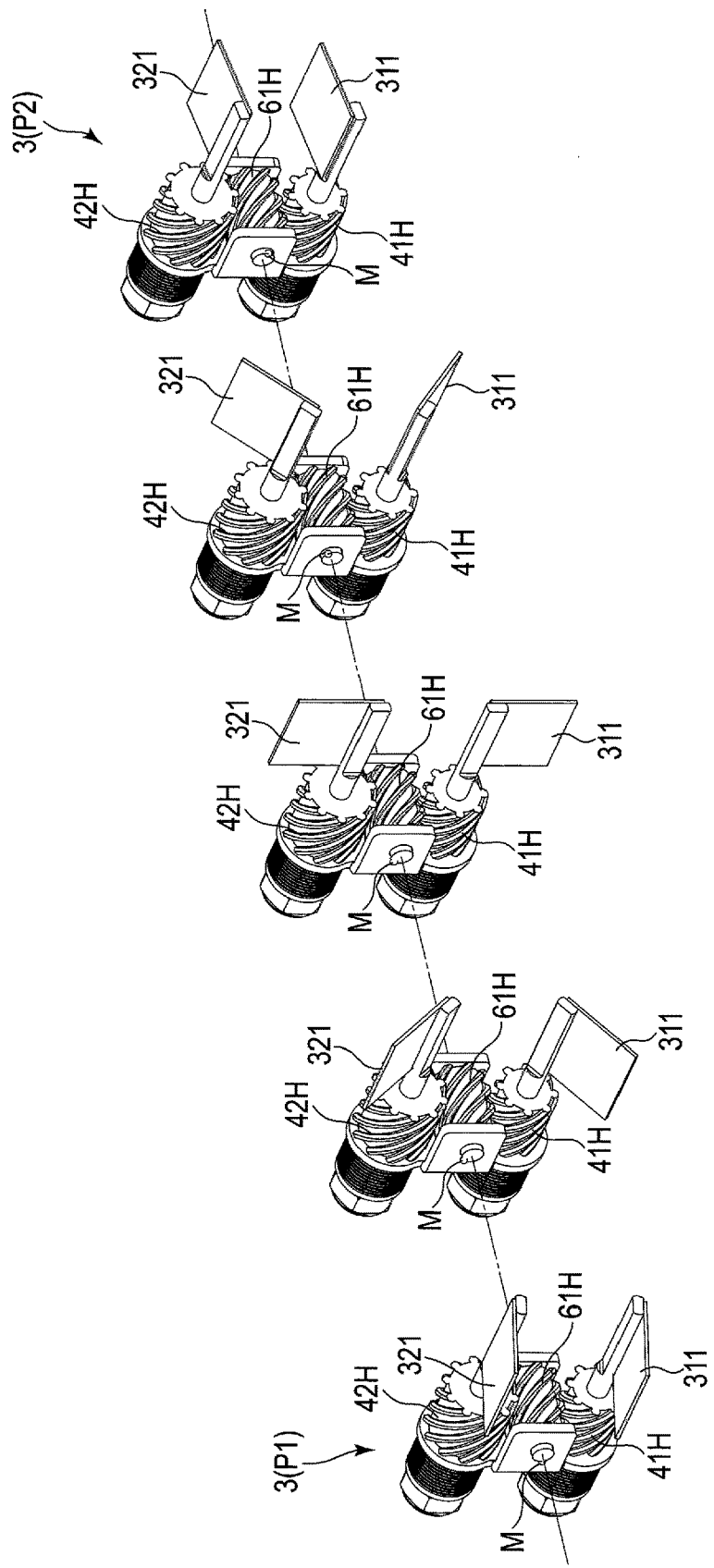
F I G. 8

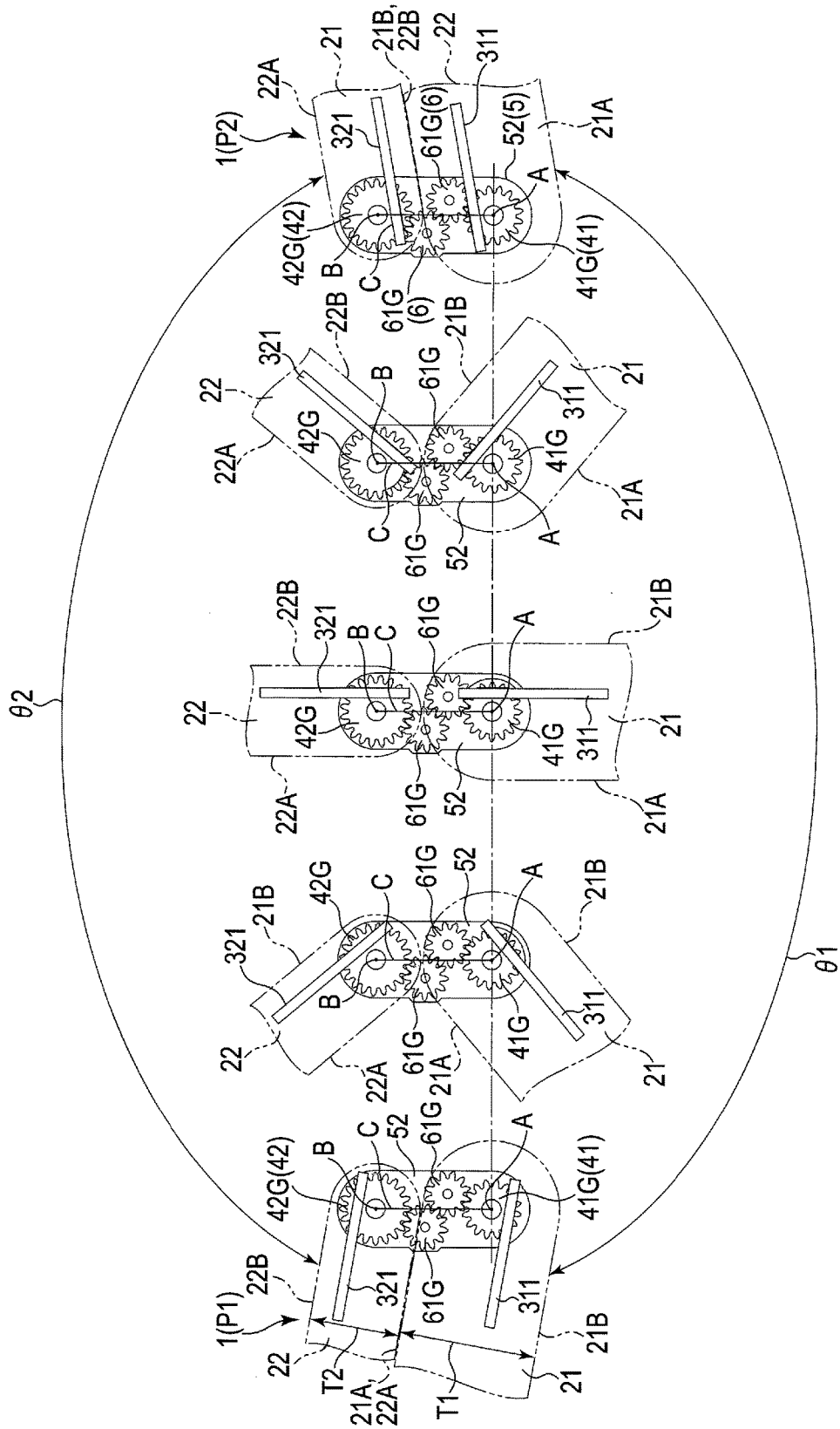
F I G. 11

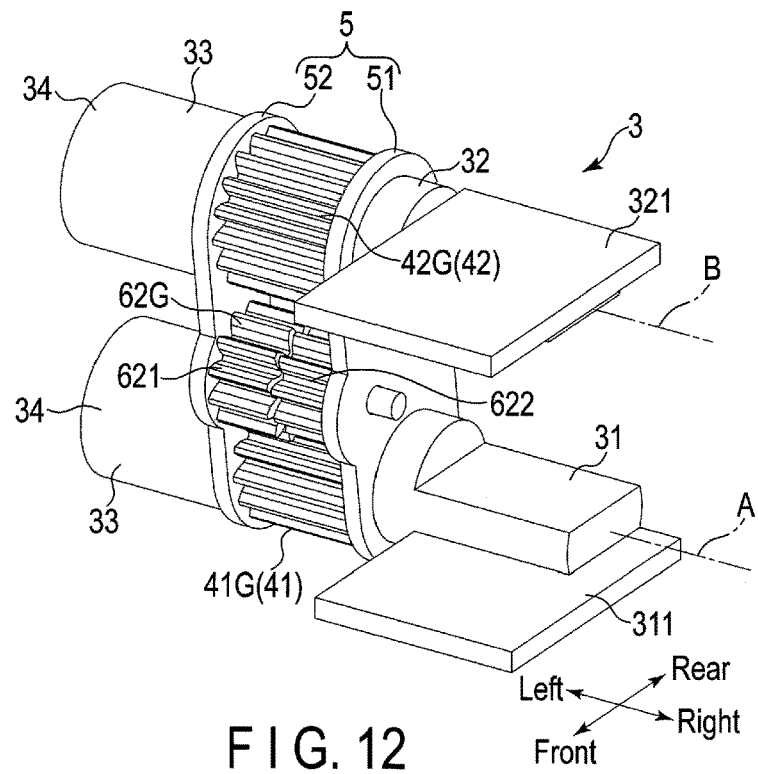
F I G. 12
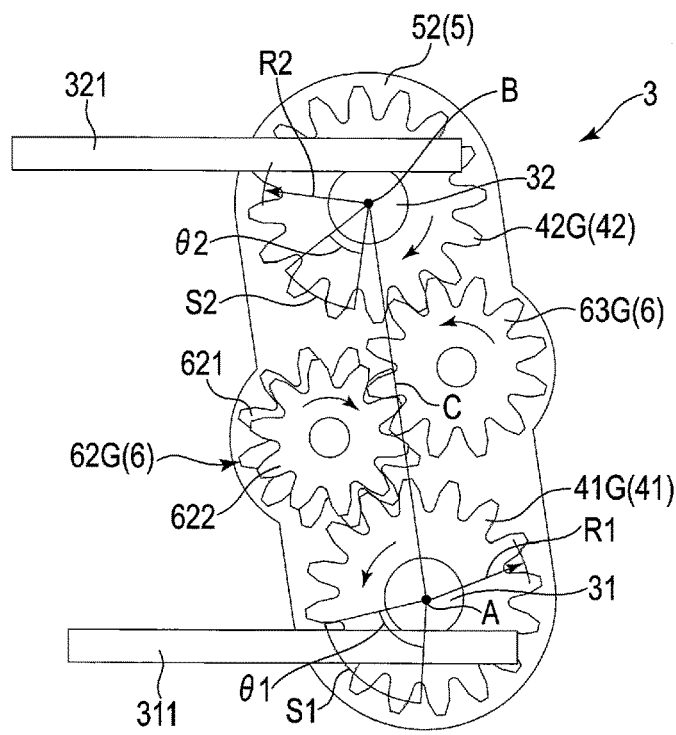
F I G. 13

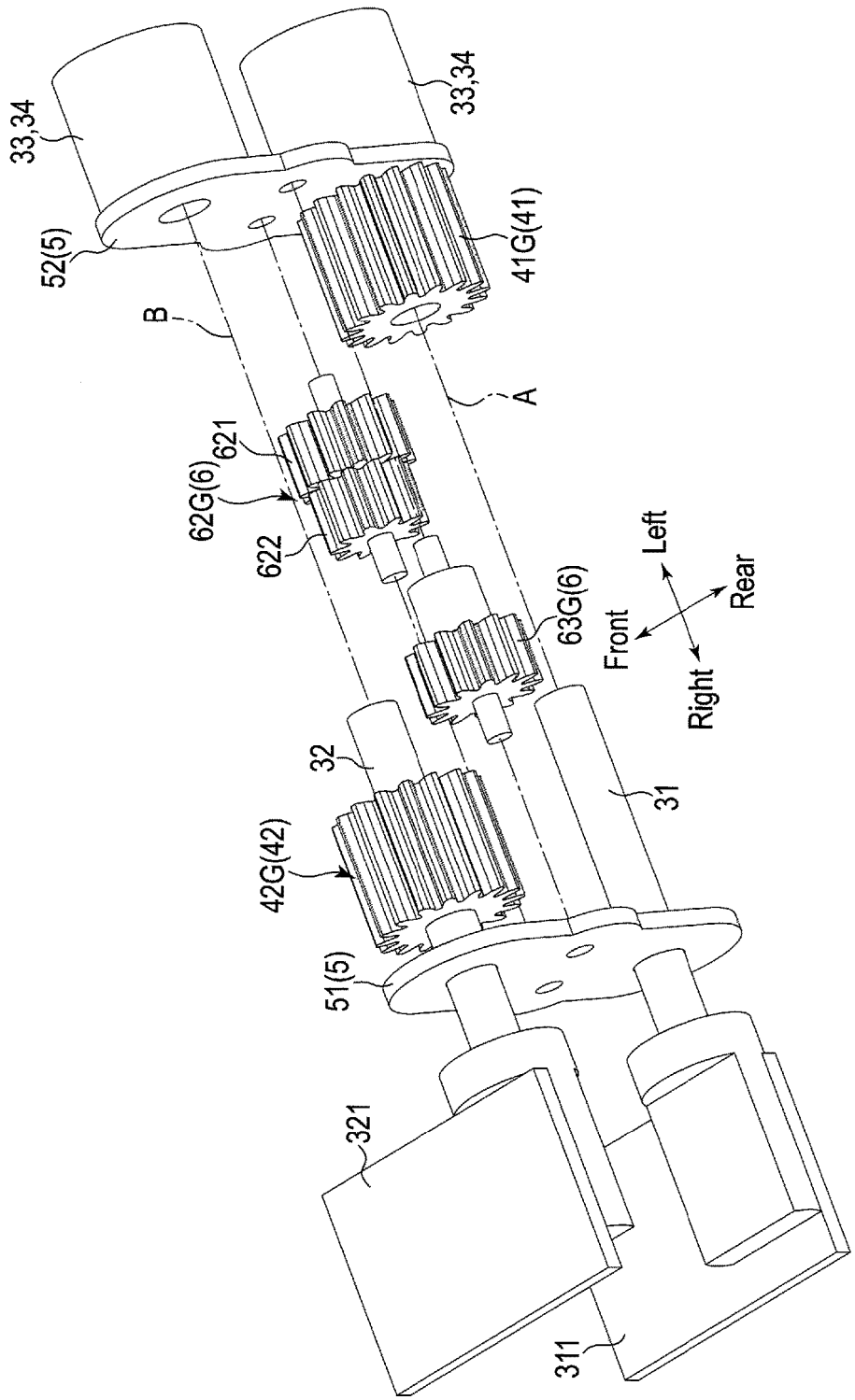
F I G. 14

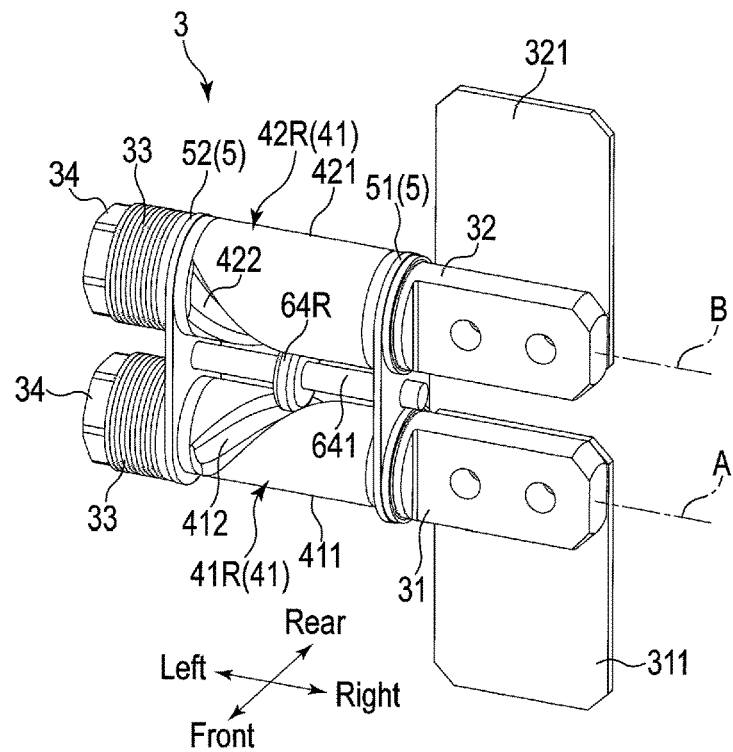
F I G. 15
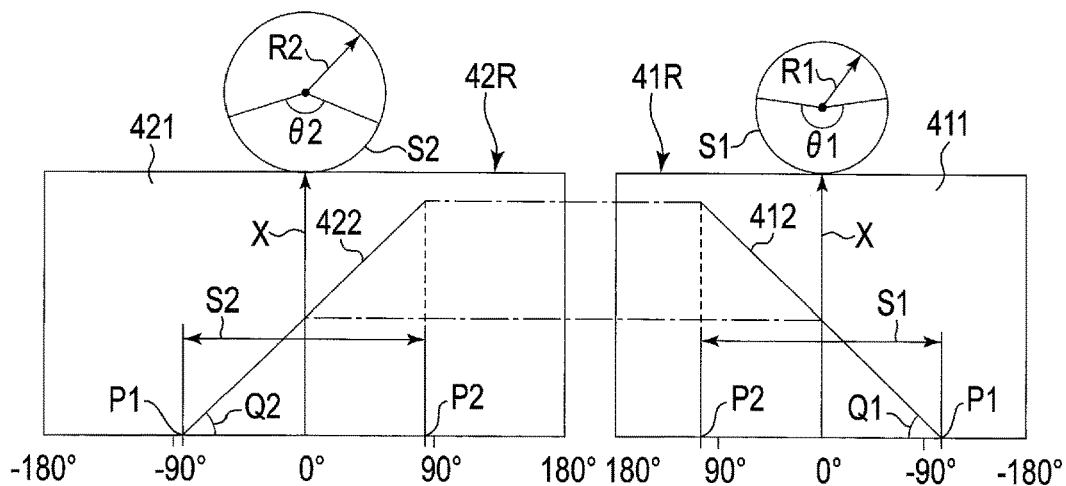
F I G. 16

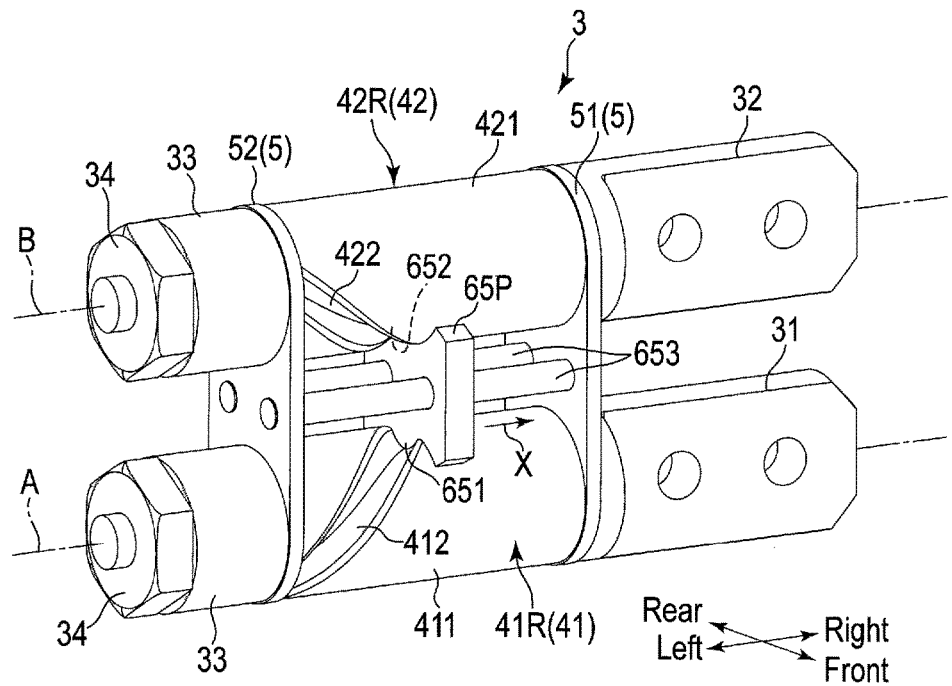
F I G. 18
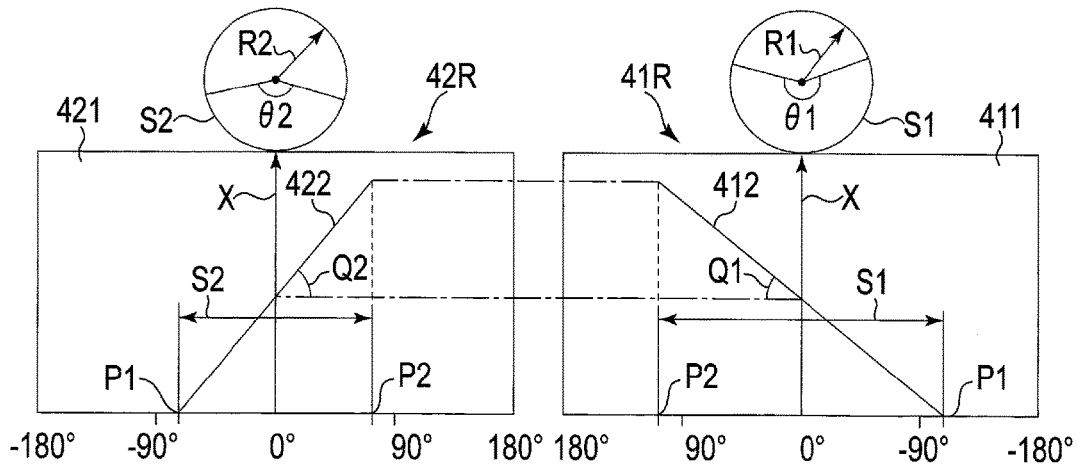
F I G. 19

ELECTRONIC APPARATUS COMPRISING TWO CASING COUPLED TOGETHER WITH TWO-PARALLEL-AXIS HINGE

CROSS-REFERENCE TO RELATED APPLICATIONS

This application is a divisional of U.S. application Ser. No. 15/429,995 filed Feb. 10, 2017, which claims the benefit of U.S. Provisional Application No. 62/294,234, filed Feb. 11, 2016, the entire contents of which are incorporated herein by reference.

FIELD

Embodiments described herein relate generally to an electronic apparatus including two casings coupled together with two-parallel-axis hinges and transforming from a clamshell mode to a tablet mode.

BACKGROUND

An electronic apparatus in which two housings are coupled with two-parallel-axis hinges is known. A gear mechanism is provided between shafts disposed to have two axes such that two-axis hinges equally rotate. The gear mechanism is simple when the two casings have the same thickness when the two casing are superimposed.

However, the required gear mechanism is complicated when the two casings have different thicknesses. A more complicated gear mechanism is required to rotate one casing by 360° to the rear side of the other casing from a state where the two casings are superimposed on each other.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 7 is an exemplary perspective view in which the electronic apparatus of FIG. 1 is transformed from the first state to the second state in a stepped manner;

FIG. 8 is an exemplary perspective view of the hinge corresponding to the electronic apparatus of FIG. 7;

FIG. 11 is an exemplary side view illustrating movement of the hinge when the electronic apparatus of FIG. 9 is transformed from a first state to a second state;

FIG. 12 is an exemplary perspective view illustrating a hinge of an electronic apparatus according to a third embodiment;

FIG. 13 is an exemplary side view illustrating a gear train inside the hinge of FIG. 12;

FIG. 14 is an exemplary exploded perspective view of the hinge of FIG. 12;

FIG. 15 is an exemplary perspective view of a hinge of an electronic apparatus according to a fourth embodiment;

FIG. 16 is an exemplary development of cylindrical surfaces of rollers of the hinge of FIG. 15;

FIG. 18 is an exemplary perspective view of a hinge of an electronic apparatus according to a fifth embodiment;

FIG. 19 is an exemplary development of cylindrical surfaces of rollers of the hinge of FIG. 18.

DETAILED DESCRIPTION

Figure 1:
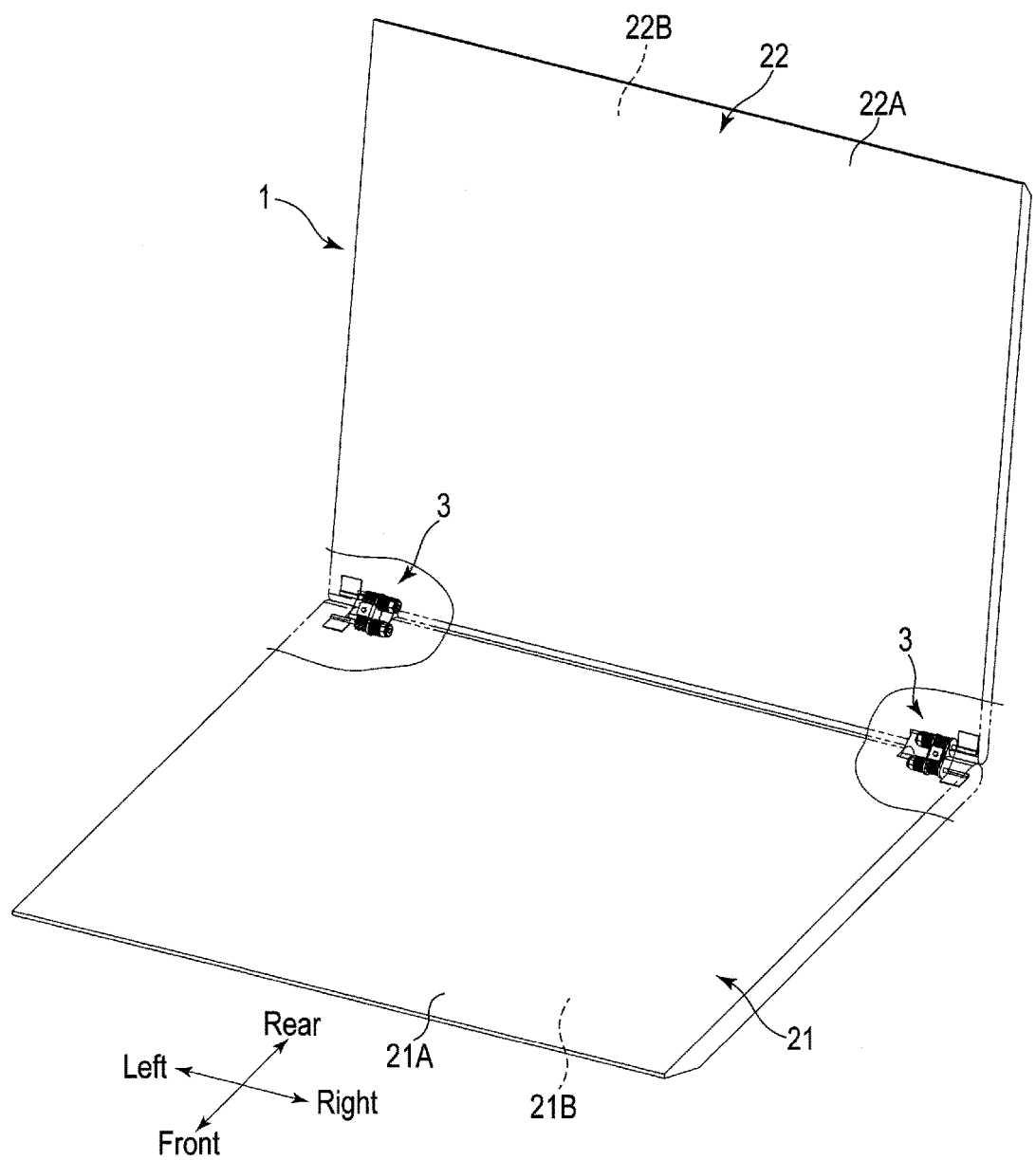
FIG. 1 is an exemplary perspective view of an electronic apparatus according to a first embodiment.

Various embodiments will be described hereinafter with reference to the accompanying drawings.

In general, according to one embodiment, an electronic apparatus comprises a first casing, a second casing, and a hinge. The first casing includes a first surface and a second surface opposite to the first surface. The second casing includes a third surface and a fourth surface opposite to the third surface. The hinge couples the first casing with the second casing continuously rotatably from a first state to a second state. The first state is a state in which the first casing and the second casing are superimposed with the third surface caused to face the first surface. The second state is a state in which the first casing and the second surface are superimposed with the fourth surface caused to face the second surface. The hinge includes a first shaft, a first rotation engaging portion, a second shaft, a second rotation engaging portion, a housing, and a transmission unit. The first shaft is fixed to the first casing. The first rotation engaging portion is fixed to the first shaft. The second shaft is fixed to the second casing. The second rotation engaging portion is fixed to the second shaft. The housing holds the first shaft and the second shaft in parallel. The transmission unit links rotation angles of the first rotation engaging portion and the second rotation engaging portion with respect to the housing from the first state to the second state. The transmission unit links the first rotation engaging portion and the second rotation engaging portion such that a line segment connecting a center of the first shaft with a center of the second shaft in a radial direction makes an acute angle with the first surface and the second surface of the first casing and makes an obtuse angle with the third surface and the fourth surface of the second casing in either of the first state and the second state.

The electronic apparatus has a structure in which the first casing and the second casing are coupled with a hinge such that the first casing and the second casing continuously rotate, and is transformed from the first state to the second state. Specifically, this means that the second casing is rotated by 360° with respect to the first casing, and the first casing is rotated by 360° with respect to the second casing. The feature that the first casing makes an acute angle with the line segment connecting the center of the first shaft with the center of the second shaft in either of the first state and the second state means that the rotation angle of the first casing transforming from the first state to the second state with respect to the line segment connecting the center of the first shaft with the center of the second shaft is 180° or more. In addition, the feature that the second casing makes an obtuse angle with the line segment connecting the center of the first shaft with the center of the second shaft in either of the first state and the second state means that the rotation angle of the second casing transforming from the first state to the second state with respect to the line segment connecting the center of the first shaft with the center of the second shaft is 180° or less. Specifically, the rotation angle of the first casing from the first state to the second state is larger than a rotation angle of the second casing. In other words, in the first rotation engaging portion and the second rotation engaging portion linked by the transmission unit, the ratio of the rotation angle of the second rotation engaging portion is smaller than the rotation angle of the first rotation engaging portion. Specifically, when the first casing and the second casing are transformed from the first state to the second state, the rotation speed of the first casing with respect to the housing is faster than the rotation speed of the second casing.

(First Embodiment)

An electronic apparatus 1 according to a first embodiment will be explained with reference to FIG. 1 to FIG. 8. The electronic apparatus 1 illustrated in FIG. 1 has a structure in which a main body serving as a first casing 21 is connected with a display unit serving as a second casing 22 with hinges 3. The electronic apparatus 1 can be used in two forms, that is, a clamshell mode in which the electronic apparatus 1 is used in a state where the first casing 21 is placed on a desktop or the like and the second casing 22 is raised with respect to the first casing 21, and a tablet mode in which the electronic apparatus 1 is used in a state where the first casing 21 and the second casing 22 are superimposed with the display surface of the second casing 22 facing front to enable a user to perform an input operation by directly touching the display surface of the second casing 22 with a pen or a finger. The electronic apparatus 1 in the clamshell mode is illustrated in FIG. 1. The electronic apparatus 1 in the tablet mode is illustrated on the rightmost side in FIG. 7.

In FIG. 1, parts of the first casing 21 and the second casing 22 are illustrated with imaginary lines (two-dot chain lines) such that the hinges 3 coupling the first casing 21 with the second casing 22 can be viewed. The electronic apparatus 1 includes the first casing 21, the second casing 22, and the hinges 3. The first casing 21 includes a first surface 21A on which a keyboard serving as an input unit in the clamshell mode is provided, and a second surface 21B opposite to the first surface 21A and serving as a bottom surface when placed on a desktop in the clamshell mode. The second casing 22 includes a third surface 22A serving as a display surface in the clamshell mode and serving as a display surface and an input surface in the tablet mode, and a fourth surface 22B located on a back surface opposite to the third surface 22A and serving as a cover.

For convenience' sake of explanation in the present specification, the parts "front", "rear", "right", and "left" are defined based on the user who views the third surface 22A of the second casing 22 in the clamshell mode illustrated in FIG. 1 from the front, and may be referred to as "front side", "rear side", "right side", and "left side", respectively, to easily specify the region of the electronic apparatus 1.

Figure 2:
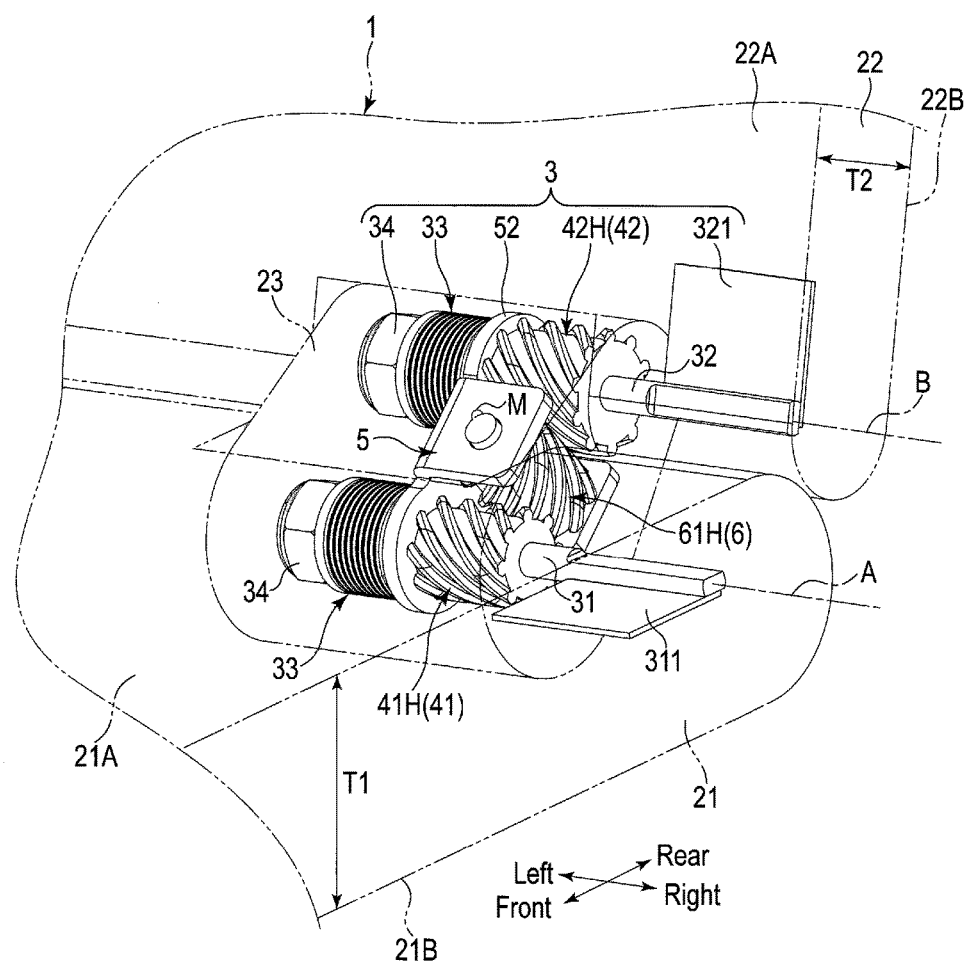
FIG. 2 is an exemplary enlarged perspective view of a hinge of the electronic apparatus of FIG. 1.
Figure 3:
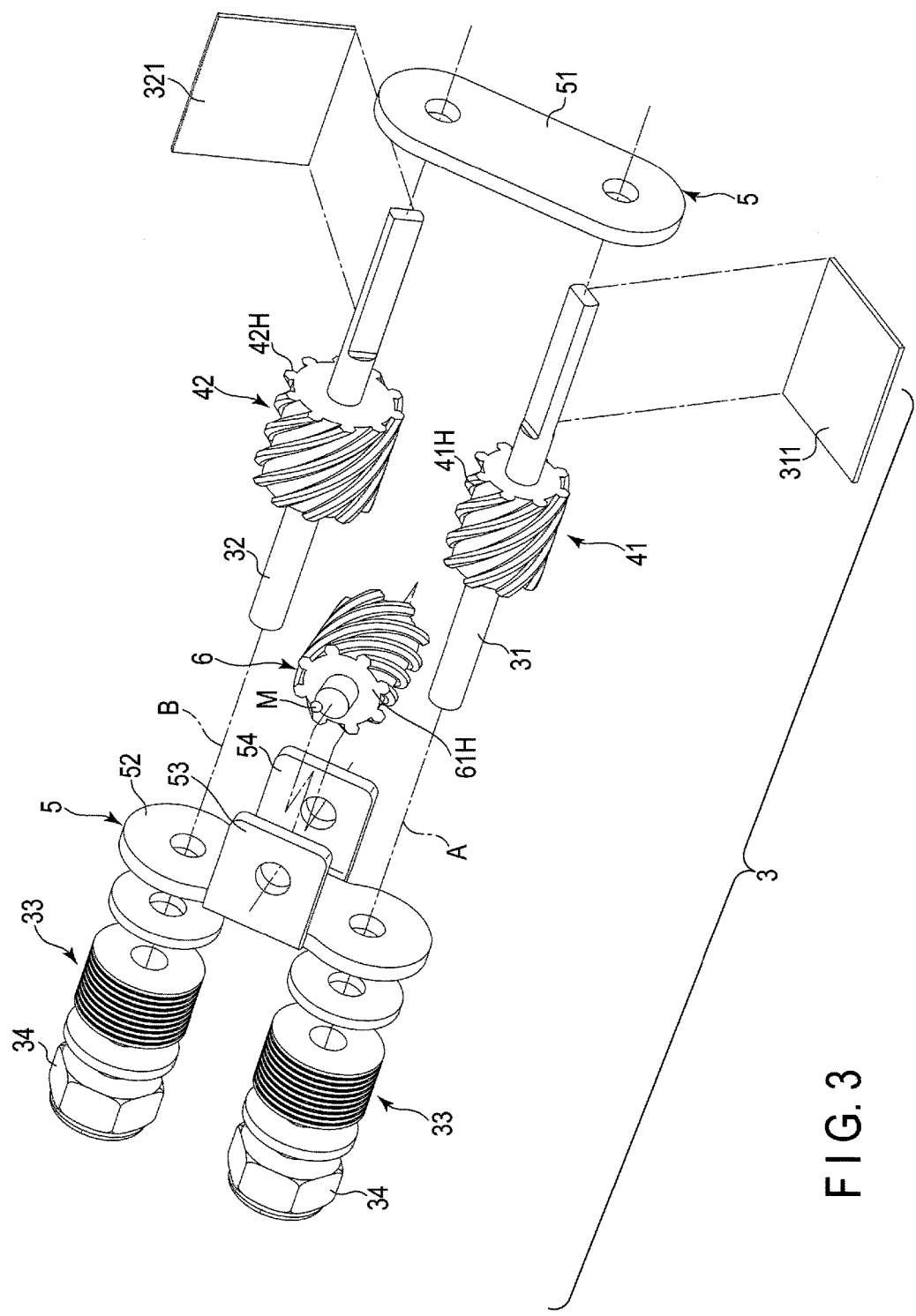
FIG. 3 is an exemplary exploded perspective view of the hinge of FIG. 2.
Figure 4:
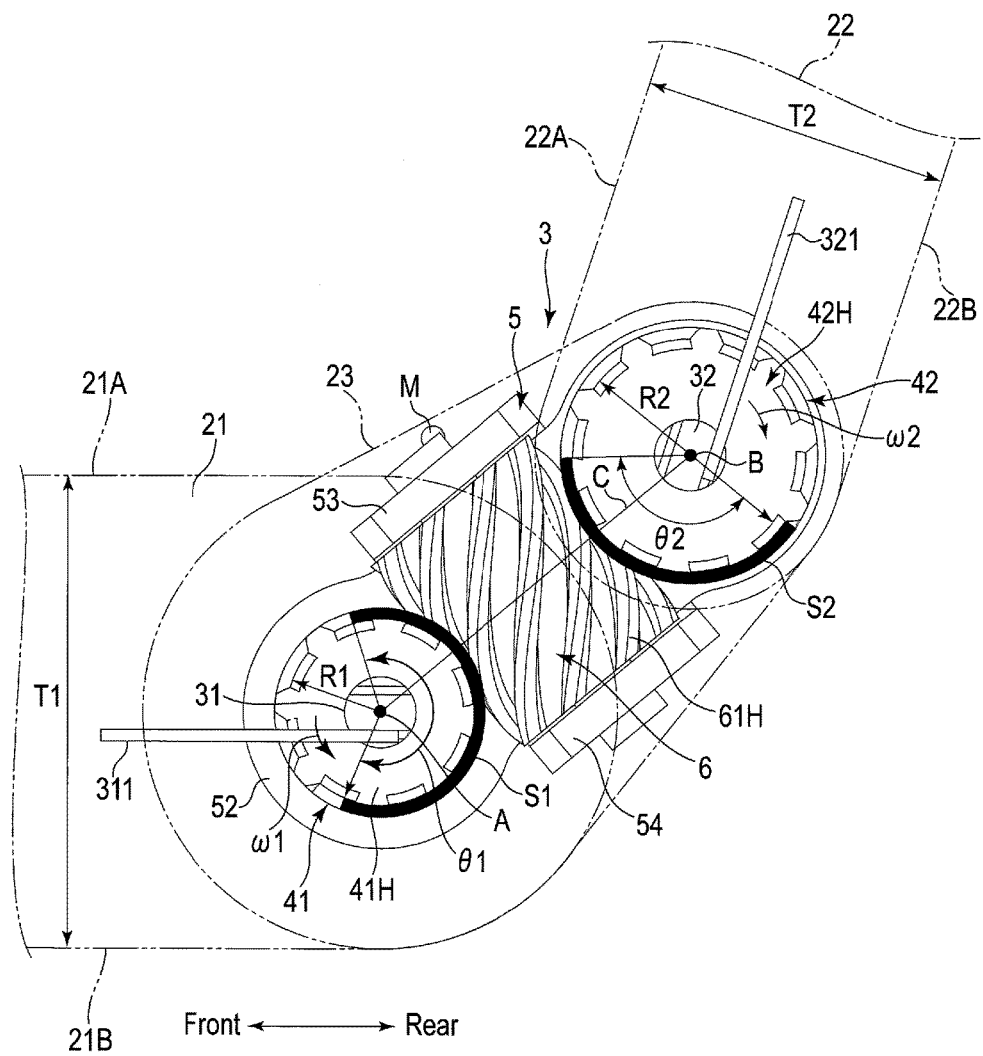
FIG. 4 is an exemplary side view of the hinge of FIG. 2 as viewed in a direction along a rotation axis.

FIG. 2 is an enlarged perspective view of the hinge 3 of the electronic apparatus 1 in the clamshell mode. FIG. 3 is an exploded perspective view of the hinge 3 of FIG. 2, and FIG. 4 is a side view of the hinge 3 of FIG. 2 from the right. As illustrated in FIG. 1, the hinges 3 are arranged in the right rear and the left rear of the first casing 21. The right hinge 3 is illustrated in FIG. 2 and FIG. 3, and the left hinge 3 has a left-and-right mirror-image structure with respect to the right hinge 3.

The hinge 3 includes a first shaft 31, a first rotation engaging portion 41, a second shaft 32, a second rotation engaging portion 42, a housing 5, and a transmission unit 6, as illustrated in FIG. 2 and FIG. 3. The first shaft 1 is disposed along the rear edge of the first casing 21, and fixed to the first casing 21 through a plate 311 extending along the inside of the first casing 21 in a radial direction. The first shaft 31 is rotated together with rotation of the first casing 21. The first rotation engaging portion 41 is coaxially attached to the first shaft 31, and fastened to the first shaft 31 by keying, brazing, or press fit. The second shaft 32 is disposed along the rear edge of the second casing 22, and fixed to the second casing 22 through a plate 321 extending along the inside of the second casing 22 in a radial direction. The second rotation engaging portion 42 is coaxially attached to the second shaft 32, and fastened to the second shaft 32 by keying, brazing, or press fit.

The transmission unit 6 to transmit rotational force is disposed between the first rotation engaging portion 41 and the second rotation engaging portion 42, to link the rotation angles of the first rotation engaging portion 41 and the second rotation engaging portion 42. In the present embodiment, the first rotation engaging portion 41, the second rotation engaging portion 42, and the transmission unit 6 serve as helical gears including helical teeth. The pitch of a first helical gear 41H serving as the first rotation engaging portion 41 and the pitch of a second helical gear 42H serving as the second rotation engaging portion 42 have inclination in the same direction as that of a right-hand screw. A third helical gear 61H serving as the transmission unit 6 has helical teeth of a right-hand screw like the first helical gear 41H and the second helical gear 42H. The third helical gear 61H is disposed between the first helical gear 41H and the second helical gear 42H in a direction orthogonal to the rotation center line, and engaged with the first helical gear 41H and the second helical gear 42H. In this manner, the third helical gear 61H links the rotation direction of the second helical gear 42H oppositely with the rotation direction of the first helical gear 41H.

The housing 5 holds the first shaft 31 and the second shaft 32 in parallel. In the present embodiment, the housing 5 includes coupling plates 51 and 52 coupling both sides of the first rotation engaging portion 41 and the second rotating engaging portion 42 in a direction along the first shaft 31 and the second shaft 32, and support pieces 53 and 54 holding the third helical gear 61H between the first helical gear 41H and the second helical gear 42H. As illustrated in FIG. 3, the support pieces 53 and 54 are formed continuously with the coupling plate 52. One support piece 53 may be formed continuously with the coupling plate 51, and the other support piece 54 may be formed continuously with the coupling plate 52.

In FIG. 2, FIG. 4, FIG. 5, FIG. 6, and FIG. 8, the coupling plate 51 is omitted, to enable easy recognition of the relation between the first helical gear 41H, the second helical gear 42H, and the third helical gear 61H. In addition, a marker M that is not actually provided is illustrated to enable easy recognition of the rotation angle of the third helical gear 61H, with respect to rotation of the first helical gear and the second helical gear 42H caused by rotation of the first shaft 31 and the second shaft 32.

Each of the first shaft 31 and the second shaft 32 extending through the coupling plate 52 and extending in a direction opposite to the first helical gear 41H and the second helical gear 42H includes a friction portion 33 consisted of a disc spring and a washer generating rotation resistance to stop at a desired rotation angle with respect to the coupling plate 52, as illustrated in FIG. 2 and FIG. 3. The rotation resistance generated by the friction portions 33 is caused by a fastening force of nuts 34 screwed at respective end portions of the first shaft 31 and the second shaft 32. As illustrated in FIG. 2, a hinge case 23 covers the first helical gear 41H, the second helical gear 42H, the housing 5 (coupling plates 51 and 52 and support pieces 53 and 54), the friction portions 33, and the nuts 34 of the hinge 3.

Figure 5:
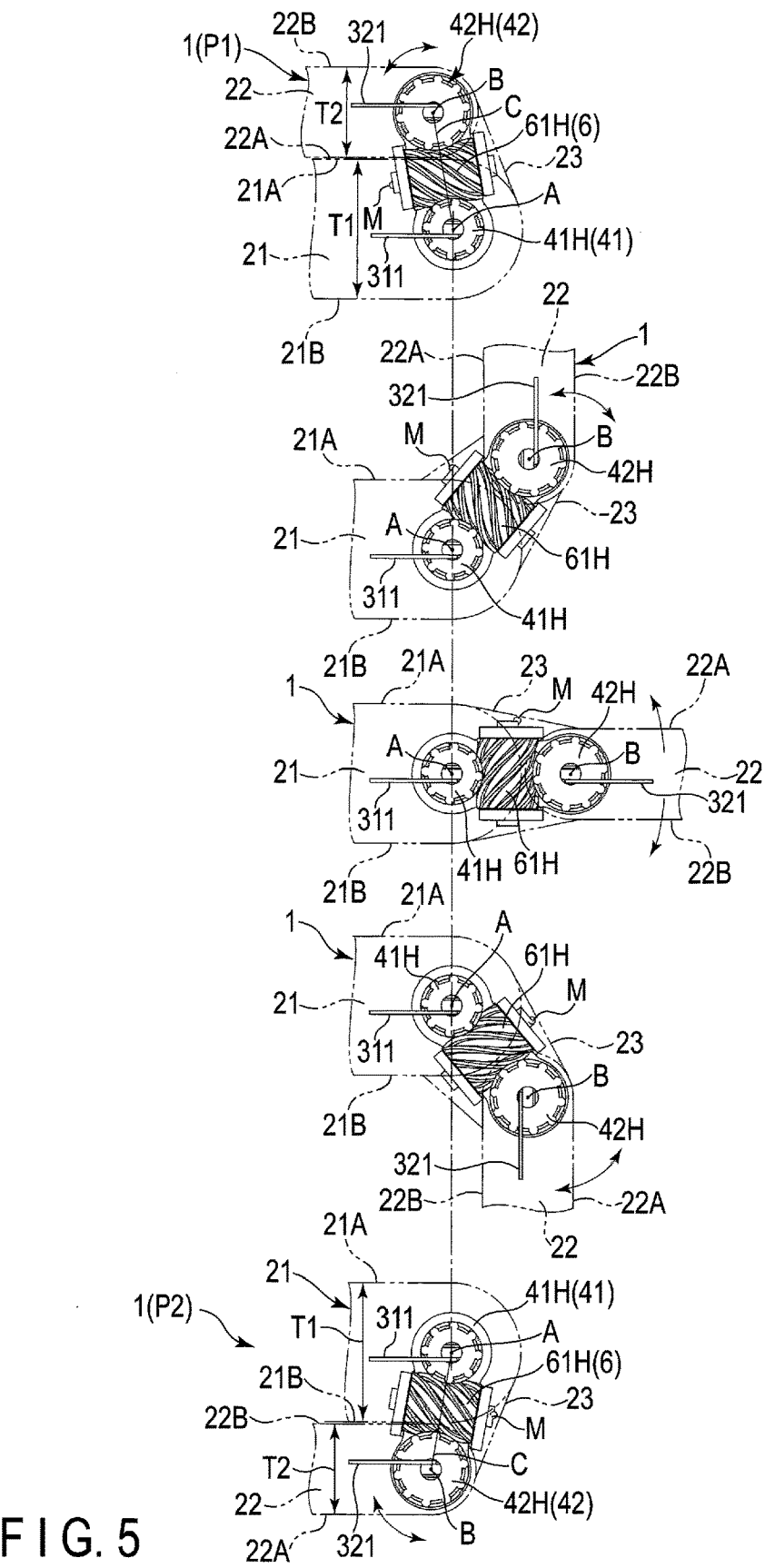
FIG. 5 is an exemplary side view illustrating a state in which the hinge of FIG. 4 transforms from a first state to a second state in a stepped manner.
Figure 6:
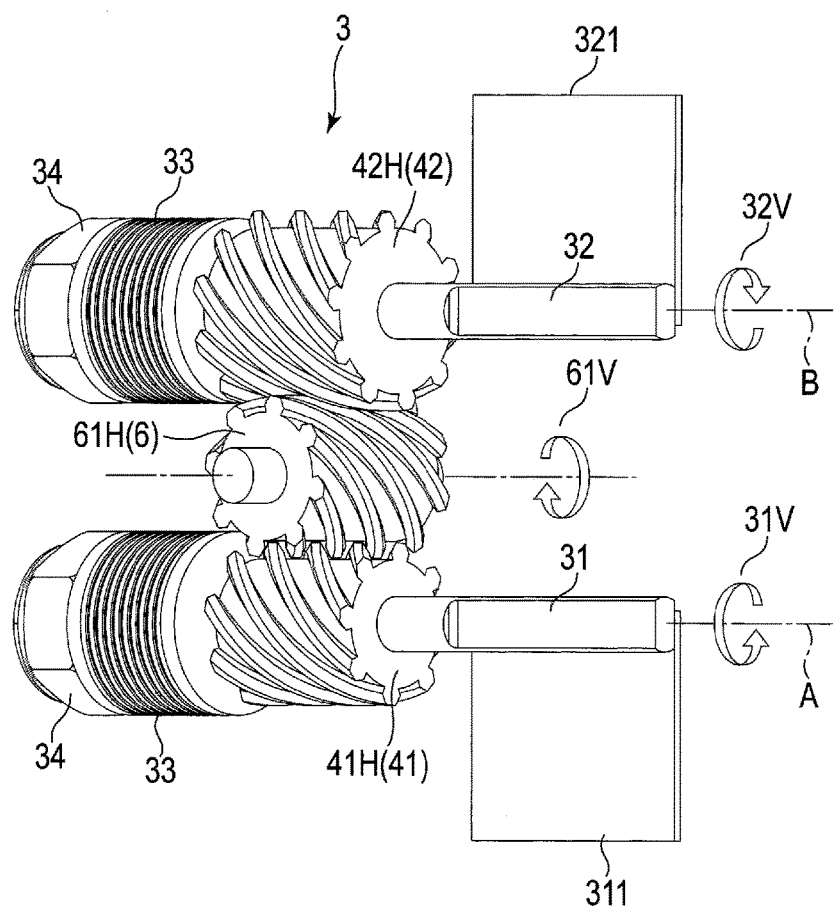
FIG. 6 is an exemplary perspective view illustrating movement of gears of the hinge of FIG. 4.

In the present embodiment, as illustrated in FIG. 2 and FIG. 4, the first casing 21 has a first size T1 from the first surface 21A to the second surface 21B, and the second casing 22 has a second size T2 from the third surface 22A to the fourth surface 22B. The second size T2 is smaller than the first size T1. In addition, as illustrated in FIG. 4 to FIG. 6, the external diameter of the second helical gear 42H is larger than the external diameter of the first helical gear 41H, that is, the second helical gear 42H has the larger number of teeth of the helical gear than that of the first helical gear 41H. An engaging radius R1 of the first helical gear 41H is smaller than an engaging radius R2 of the second helical gear 42H.

As illustrated in FIG. 7 and FIG. 8, the hinges 3 couple the second casing 22 with the first casing 21 such that the second casing 22 is continuously rotatable with respect to the first casing 21, from a first state P1 in which the first casing 21 is superimposed on the second casing 22 with the third surface 22A facing the first surface 21A, to a second state P2 in which the first casing 21 is superimposed on the second casing 22 with the fourth surface 22B facing the second surface 21B.

FIG. 4 is a side view of the hinge 3 in the case where the electronic apparatus 1 is used in the clamshell mode, and FIG. 5 illustrates a process in which the second casing 22 is rotated from the first state P1 to the second state P2 based on the first casing 21 in a stepped manner. In FIG. 5, the hinge 3 in the first state P1 is illustrated uppermost, and the hinge 3 in the second state P2 is illustrated lowermost. FIG. 6 is a perspective view of the right hinge as viewed from the right front in a state where the first casing and the second casing are disposed in a straight line, during a process in which the electronic apparatus is transformed from the first state P1 to the second state P2. FIG. 7 is a perspective view in which the electronic apparatus 1 is transformed from the first state P1 to the second state P2 in a stepped manner. The electronic apparatus 1 in the first state P1 is illustrated in the leftmost part in FIG. 7, and the electronic apparatus 1 in the second state P2 is illustrated in the rightmost part in FIG. 7. FIG. 8 is a perspective view of a process in which the electronic apparatus 1 is transformed from the first state P1 to the second state P2 like FIG. 7, based on the hinges 3. FIG. 7 and FIG. 8 illustrate the first casing 21 and the second casing 22 that are rotated based on the hinges 3, to enable easy recognition of the rotation angles of the first casing 21 and the second casing 22 with respect to the hinges 3.

As illustrated in FIG. 5, in either of the cases where the electronic apparatus 1 is in the first state P1 or the second state P2, the third helical gear 61H serving as the transmission unit 6 is engaged with the first helical gear 41H and the second helical gear 42H, such that a line segment C connecting the center A of the first shaft 31 with the center B of the second shaft 32 makes an acute angle with the first casing 21 and makes an obtuse angle with the second casing 22. An engaging radius R3 of the third helical gear 61H may agree with, or disagree with, one of the engaging radius R1 of the first helical gear 41H and the engaging radius R2 of the second helical gear 42H. In consideration of smooth movement of the hinges 3 without bulkiness, the engaging radius R3 of the third helical gear 61H is set between the engaging radius R1 of the first helical gear 41H and the engaging radius R2 of the second helical gear 42H. In the present embodiment, the engaging radius R3 of the third helical gear 61H is set equal to the engaging radius R2 of the second helical gear 42H.

Like the hinge illustrated in the center of FIG. 5, when the first surface 21A and the second surface 21B of the first casing 21 are parallel with the line segment C connecting the center A of the first shaft 31 with the center B of the second shaft 32, the third surface 22A and the fourth surface 22B of the second casing 22 also become parallel with the line segment C. Specifically, the electronic apparatus 1 is in the state in which the first casing 21, the hinge case 23, and the second casing 22 extend in a straight line. When the second casing 22 is rotated with respect to the first casing 21 from the first state P1 to the second state P2 as illustrated in FIG. 5, that is, when the second casing 22 is rotated by 360° with respect to the first casing 21, an angle θ1 at which the first casing 21 is rotated with respect to the line segment C (or hinge case 23) connecting the center A of the first shaft 31 with the center B of the second shaft 32 is larger than an angle θ2 at which the second casing 22 is rotated with respect to the line segment C (or hinge case 23), as illustrated in FIG. 7 and FIG. 8. Specifically, the rotation speed of the first shaft 31 with respect to the line segment C is faster than the rotation speed of the second shaft 32.

In addition, when the electronic apparatus 1 is transformed from the first state P1 to the second state P2 as illustrated in FIG. 7 and FIG. 8, as the hinge 3 illustrated in FIG. 6 is viewed from the right, the first shaft 31 (first casing 21) is rotated counterclockwise as indicated by an arrow 31V, and the second shaft 32 (second casing 22) is rotated clockwise as indicated by an arrow 32V. The third helical gear 61H serving as the transmission unit 6 is rotated clockwise as indicated by an arrow 61V, when the hinge 3 illustrated in FIG. 6 is viewed from the front.

As illustrated in FIG. 5, the second size T2 being the thickness of the second casing 22 is smaller than the first size T1 being the thickness of the first casing 21, and the line segment C makes an acute angle with the first casing 21, and the line segment C makes an obtuse angle with the second casing 22, with respect to the line segment C connecting the center A of the first shaft 31 with the center B of the second shaft 32 in either of the first state P1 and the second state P2. Specifically, in the first state P1, the rear end of the second casing 22 is positioned on a slightly more front side than the rear end of the first casing 21.

The electronic apparatus 1 structured as described above satisfies the following conditions in operations of the hinges 3. When the second casing 22 is rotated from the first state P1 to the second state P2 with respect to the first casing 21, a circumferential length S1 along the engaging radius R1 when the first helical gear 41H is rotated by an angle θ1 satisfies "S1=πR1θ1", when R1 is the engaging radius of the first helical gear 41H, R2 is the engaging radius of the second helical gear 42H, θ1 is an rotation angle of the first casing 21 around the first shaft 31, that is, a rotation angle of the first helical gear 41H with respect to the center A of the first shaft 31, and θ2 is an rotation angle of the second casing 22 around the second shaft 32, that is, a rotation angle of the second helical gear 42H with respect to the center B of the second shaft 32. In addition, a circumferential length S2 along the engaging radius R2 when the second helical gear 42H is rotated by an angle θ2 satisfies "S2=πR2θ2".

Because the first helical gear 41H is linked with the second helical gear 42H through the third helical gear 61H, the circumferential length S1 with which the first helical gear 41H in rotation is engaged with the third helical gear 61H is equal to the circumferential length S2 with which the second helical gear 42H in rotation is engaged with the third helical gear 61H. Accordingly, "S1=S2" is satisfied. As a result, the relation of Expression (1) is obtained.

$$R1/R2=\theta2/\theta1 \quad (1)$$

In addition, because time t1 with which the first helical gear 41H is rotated by angle θ1 is the same as time t2 with which the second helical gear 42H is rotated by angle θ2, both of them is referred to as rotation time t. When ω1 is an angular velocity at the time when the first helical gear 41H is rotated, and ω2 is an angular velocity at the time when the second helical gear 42H is rotated, "θ1=ω1*t*" and "θ2=ω2*t*" are satisfied. When these values are substituted for the values in Expression (1), the relation of Expression (2) is obtained.

$$R1/R2=\omega2/\omega1 \quad (2)$$

In addition, N1 is the number of teeth of the first helical gear 41H and N2 is the number of teeth of the second helical gear 42H, the relation of Expression (3) is obtained. Each of N1 and N2 is an integer.

$$R1/R2=N1/N2 \quad (3)$$

In the electronic apparatus 1 structured as described above, the second casing 22 is enabled to rotate by 360° with respect to the first casing 21, from the first state P1 illustrated in the uppermost part in FIG. 5 to the second state P2 illustrated in the lowermost part in FIG. 5, through the state in which the first casing 21 is aligned flat with the second casing 22 as illustrated in the middle part in FIG. 5. In this state, as illustrated in FIG. 7, the front edge of the first casing 21 matches with the front edge of the second casing 22 in both the first state P1 and the second state P2.

As described above, in the electronic apparatus 1, because the first rotation engaging portion 41 of the first shaft 31 is linked with the second rotation engaging portion 42 of the second shaft 32 with the transmission unit 6, the first casing 21 and the second casing 22 are smoothly rotated in an equal ratio when the electronic apparatus 1 is transformed from the first state P1 through the clamshell mode to the second state P2 being the tablet mode, or conversely from the second state P2 to the first state P1. In addition, because the first rotation engaging portion 41, the second rotation engaging portion 42, and the transmission unit 6 are the first helical gear 41H, the second helical gear 42H, and the third helical gear 61H, respectively, the electronic apparatus 1 requires a small number of components, and prevents bulkiness of the hinges 3.

In addition, with the electronic apparatus 1 of the present embodiment, as illustrated in FIG. 5, the second size T2 of the second casing 22 is smaller than the first size T1 of the first casing 21, and the first casing 21 is disposed at an acute angle with respect to the line segment C connecting the center A of the first shaft 31 with the center B of the second shaft 32 in either of the first state P1 and the second state P2.

Specifically, the rear edge of the second casing 22 is disposed on a more front side than the rear edge of the first casing 21. Accordingly, when the electronic apparatus 1 is used in the clamshell mode as in FIG. 1, the rear edge of the first casing is not blocked with the second casing 22 as illustrated in FIG. 4. This structure enables use of the rear edge of the first casing to be provided with an air intake and an air outlet to discharge heat generated inside the first casing 21, or provided with a terminal to be connected with a peripheral device.

The following is explanation of electronic apparatuses according to second to fifth embodiments. In each of the embodiments, constituent elements having the same functions as those of the constituent elements of the electronic apparatus 1 according to the first embodiment will be denoted by the same reference numerals in the drawings and the following explanation. The description and related drawings of the first embodiment are referred to for the detailed explanation thereof.

(Second Embodiment)

Figure 9:
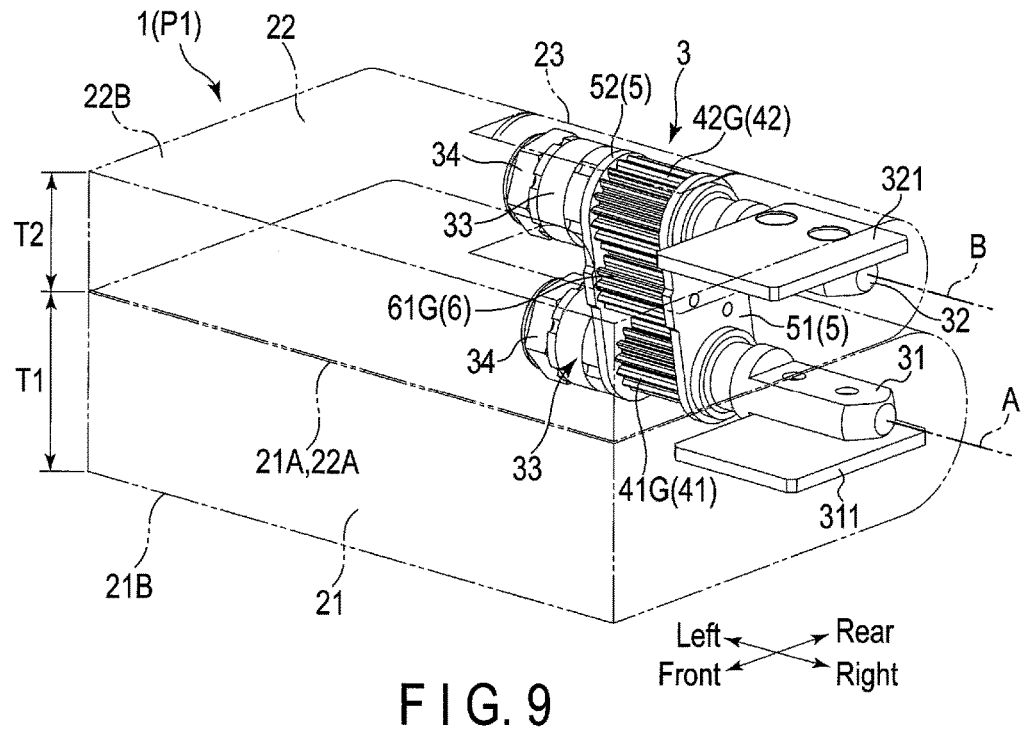
FIG. 9 is an exemplary enlarged perspective view of a hinge of an electronic apparatus according to a second embodiment.
Figure 10:
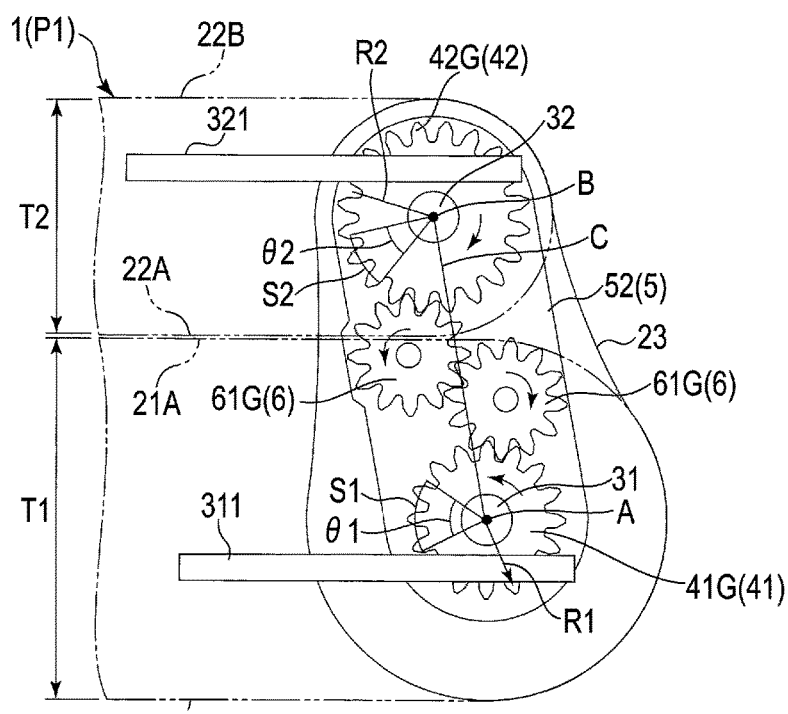
FIG. 10 is an exemplary side view illustrating a gear train inside the hinge of FIG. 9.

An electronic apparatus 1 of the second embodiment will be explained with reference to FIG. 9 to FIG. 11. FIG. 9 is a perspective view illustrating the right hinge 3 of the electronic apparatus 1 in the first state P1, and FIG. 10 illustrates a side view of the hinge 3 as viewed from the right in a direction along the first shaft 31 and the second shaft 32. FIG. 11 illustrates a process of transforming the electronic apparatus 1 of FIG. 10 in shape in a stepped manner, from the first state P1 to the second state P2, or the second state P2 to the first state P1. In FIG. 11, the first state P1 is illustrated in the leftmost part, and the second state P2 is illustrated in the rightmost part. FIG. 10 and FIG. 11 illustrate a gear train G configured of a first spur gear 41G, a second spur gear 42G, and third spur gears 61G, and plates 311 and 321 attached to the first shaft 31 and the second shaft 32, respectively, to enable easy understanding of each of the spur gears inside the hinge 3.

Like the first embodiment, the electronic apparatus 1 according to the second embodiment has a structure in which the second size T2 of the second casing 22 is smaller than the first size T1 of the first casing 21 as illustrated in FIG. 1. In addition, each hinge 3 of the electronic apparatus 1 includes the first spur gear 41G as the first rotation engaging portion 41 fixed to the first shaft 31, and the second spur gear 42G having an external diameter larger than an external diameter of the first spur gear 41G and serving as the second rotation engaging portion 42 fixed to the second shaft 32.

The hinge 3 includes at least two third spur gears 61G serving as the transmission unit 6 linking the first spur gear 41G with the second spur gear 42G. The third spur gears 61G are arranged in parallel with the first spur gear 41G and the second spur gear 42G. The third spur gears 61G are interposed between the first spur gear 41G and the second spur gears 42G, to cause the rotation direction of the second spur gear 42G to be opposite to the rotation direction of the first spur gear 41G.

FIG. 11 illustrates the line segment C connecting the center A of the first shaft 31 of the hinge 3 with the center B of the second shaft 32, to be disposed vertically, to enable easy recognition of rotation angles θ1 and θ2 of the first casing 21 and the second casing 22. With the electronic apparatus 1 of the second embodiment, the rotation angle θ1 of the first casing 21 is larger than the rotation angle θ2 of the second casing 22, when the second casing 22 is rotated with respect to the first casing 21 from the first state P1 to the second state P2, or from the second state P2 to the first state P1, like the first embodiment. Specifically, the rotation speed of the first casing 21 (first shaft 31) is faster than the rotation speed of the second casing 22 (second shaft 32), with respect to the line segment C connecting the center A of the first shaft 31 of the hinge 3 with the center B of the second shaft 32.

With the electronic apparatus 1 structured as described above according to the second embodiment, the first casing 21 and the second casing 22 are connected with the hinges 3 to be continuously rotatable from the first state P1 to the second state P2, like the electronic apparatus 1 of the first embodiment. Because spur gears (first spur gear 41G, second spur gear 42G, and third spur gears 61G) are adopted as the first rotation engaging portion 41, the second rotation engaging portion 42, and the transmission unit 6, the electronic apparatus 1 has a simple structure, and enables suppression of the manufacturing cost.

(Third Embodiment)

An electronic apparatus 1 according to the third embodiment will be explained with reference to FIG. 12 to FIG. 14. FIG. 12 is a perspective view illustrating the hinge 3 disposed on the right side of the electronic apparatus 1 in the first state P1. FIG. 13 illustrates a side view of the hinge 3 of FIG. 12 as viewed from the right in a direction along the first shaft 31 and the second shaft 32. As illustrated in FIG. 13, the hinge 3 includes a gear train G consisted of a first spur gear 41G serving as the first rotation engaging portion 41, a second spur gear 42G serving as the second rotation engaging portion 42, a speed change gear 62G meshed with the first spur gear 41G and having a speed change ratio to set the rotation angle (that is, rotation angle θ2 of the second casing 22) of the second spur gear 42G to be smaller than the rotation angle (that is, rotation angle θ1 of the first casing 21) of the first spur gear 41G, and a transmission gear 63G disposed between the second spur gear 42G and the speed change gear 62G and causing the rotation direction of the second spur gear 42G to be linked oppositely with the rotation direction of the first spur gear 41G.

In the third embodiment, as illustrated in FIG. 13, the first spur gear 41G and the second spur gear 42G have the same external diameter and the same number of teeth, and the speed change gear 62G makes the rotation angles of the first spur gear 41G and the second spur gear 42G different from each other. As illustrated in FIG. 14, the speed change gear 62G includes a large-diameter portion 621 meshed with the first spur gear 41G, and a small-diameter portion 622 meshed with the second spur gear 42G. In the present embodiment, the large-diameter portion 621 of the speed change gear 62G is meshed with the first spur gear 41G, and the small-diameter portion 622 is meshed with the transmission gear 63G. The transmission gear 63G may be disposed between the first spur gear 41G and the speed change gear 62G, instead of being disposed between the second spur gear 42G and the speed change gear 62G. The first spur gear 41G may have teeth only in a range meshed with the large-diameter portion 621 of the speed change gear 62G. The second spur gear 42G may have teeth only in a range meshed with the transmission gear 63G.

As described above, with the electronic apparatus 1 with the hinges 3 structured as described above according to the third embodiment, the rotation angle θ1 of the first casing 21 is larger than the rotation angle θ2 of the second casing 22, when the electronic apparatus 1 is transformed from the first state P1 to the second state P2, or conversely, in the same manner as the electronic apparatuses 1 according to the first and the second embodiments. In addition, because the transmission unit 6 includes the speed change gear 62G, the external diameter of the second spur gear 42G serving as the second rotation engaging portion 42 can be set equal to or smaller than the external diameter of the first spur gear 41G serving as the first rotation engaging portion 41. Because the second size T2 of the second casing 22 is smaller than the first size T1 of the first casing 21, the external diameter of the second spur gear 42G can be reduced. This structure enables a further compact structure of the hinge portion, and excellent design of the electronic apparatus 1.

(Fourth Embodiment)

An electronic apparatus 1 according to the fourth embodiment will be explained with reference to FIG. 15 to FIG. 17. FIG. 15 is a perspective view of the hinge 3 disposed on the right side of the electronic apparatus 1, and in a middle state between the first state P1 and the second state P2, that is, in a state where the first casing 21 and the second casing 22 extend along the same plane. The hinge 3 in the present embodiment includes a first cam roller 41R serving as the first rotation engaging portion 41, a second cam roller 42R serving as the second rotation engaging portion 42, and an engaging element 64R serving as the transmission unit 6 to synchronize rotation angles of the rollers. The first cam roller 41R includes a first spiral groove 412 in a cylindrical surface 411 parallel with the first shaft 31. The second cam roller 42R includes a second spiral groove 422 running in a direction opposite to the first spiral groove 412 in a cylindrical surface 421 parallel with the second shaft 32 and having an external diameter larger than an external diameter of the first cam roller 41R. The engaging element 64R is fitted into the first spiral groove 412 and the second spiral groove 422, and movable in a direction along the first shaft 31 and the second shaft 32. When the first casing 21 and the second casing 22 are transformed from the first state P1 to the second state P2, or conversely from the second state P2 to the first state P1, the engaging element 64R is moved along a guide rod 641 disposed between and in parallel with the first shaft 31 and the second shaft 32, by rotation of the first cam roller 41R and the second cam roller 42R in mutually opposite directions.

FIG. 16 is a schematic diagram in which the cylindrical surface 411 of the first cam roller 41R and the cylindrical surface 421 of the second cam roller 42R are developed. FIG. 16 illustrates the cylindrical surface 411 of the first cam roller 41R on the right, and the cylindrical surface 421 of the second cam roller 42R on the left. In FIG. 16, the positions of zero degree indicate the state of FIG. 15 and the center state in FIG. 17. FIG. 17 illustrates the right hinge 3 of the electronic apparatus 1 as viewed from the rear center side toward the right front, and illustrates a process in which the hinge 3 is transformed from the first state P1 illustrated in the right end in the drawing to the second state P2 illustrated in the left end in a stepped manner.

As illustrated in FIG. 16, a slope (pitch) Q1 of the spiral of the first spiral groove 412 and a slope (pitch) Q2 of the spiral of the second spiral groove 422 are set to the same angle. In addition, when the electronic apparatus 1 is transformed from the first state P1 to the second state P2 or conversely from the second state P2 to the first state P1, a circumferential length S1 with which the first spiral groove 412 of the first cam roller 41R is in slide contact with the engaging element 64R is set to the same length as a circumferential length S2 with which the second spiral groove 422 of the second cam roller 42R is in slide contact with the engaging element 64R. Accordingly, when the electronic apparatus is transformed from the first state P1 to the second state P2 or conversely from the second state P2 to the first state P1, the first cam roller 41R is rotated by 90° or more based on 0°, while the second cam roller 42R is rotated by less than 90° based on 0°, as illustrated in FIG. 16.

Figure 17:
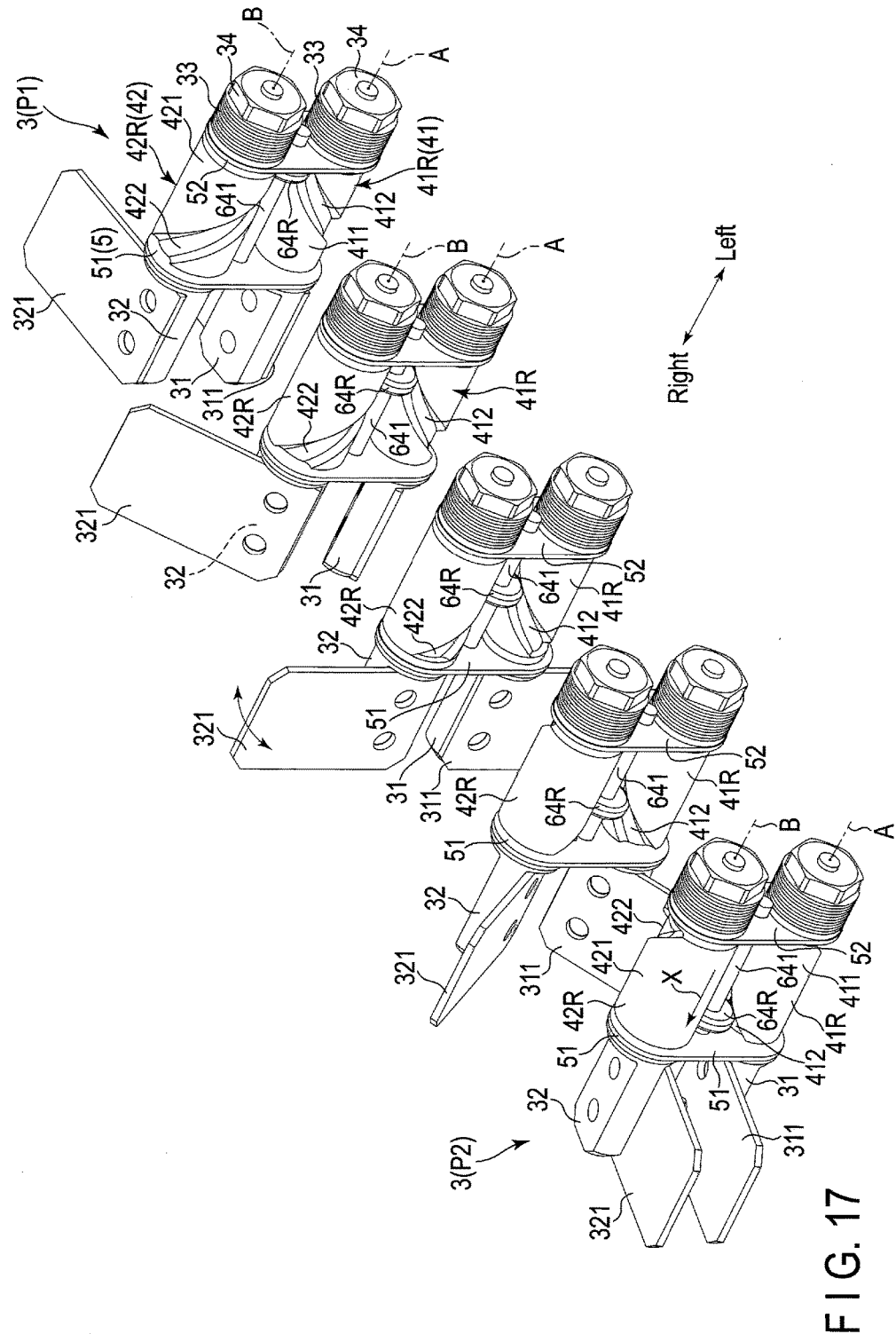
FIG. 17 is an exemplary perspective view illustrating movement of the hinge when the hinge of FIG. 15 is transformed from a first state to a second state of the electronic apparatus.

As illustrated in FIG. 17, with rotation of the first cam roller 41R and the second cam roller 42R, the engaging element 64R located on the friction portion 33 side in the first state P1 is moved to the plates 311 and 321 side in the second state P2. The X direction in FIG. 16 indicates a direction going from the friction portion 33 toward the plates 311 and 321. The engaging element 64R is engaged in the same position in the X direction with the first cam roller 41R and the second cam roller 42R, and thereby links the rotation angles of the first cam roller 41R and the second cam roller 42R.

With the electronic apparatus 1 structured as described above according to the fourth embodiment, when the second casing 22 is rotated by 360° with respect to the first casing 21 from the first state P1 to the second state P2, because the engaging element 64R is fitted into the first spiral groove 412 of the first cam roller 41R and the second spiral groove 422 of the second cam roller 42R, the rotation angles of the first shape 31 and the second shaft 32 are linked with the housing 5. As a result, this structure enables shape of the electronic apparatus 1 to transform smoothly from the first state P1 to the second state P2, and from the second state P2 to the first state P1. Because the engaging element 64R serving as the transmission unit 6 is disposed between the first cam roller 41R and the second cam roller 42R, the engaging element 64R does not bulk outward beyond the first cam roller 41R and the second cam roller 42R.

(Fifth Embodiment)

Figure 20:
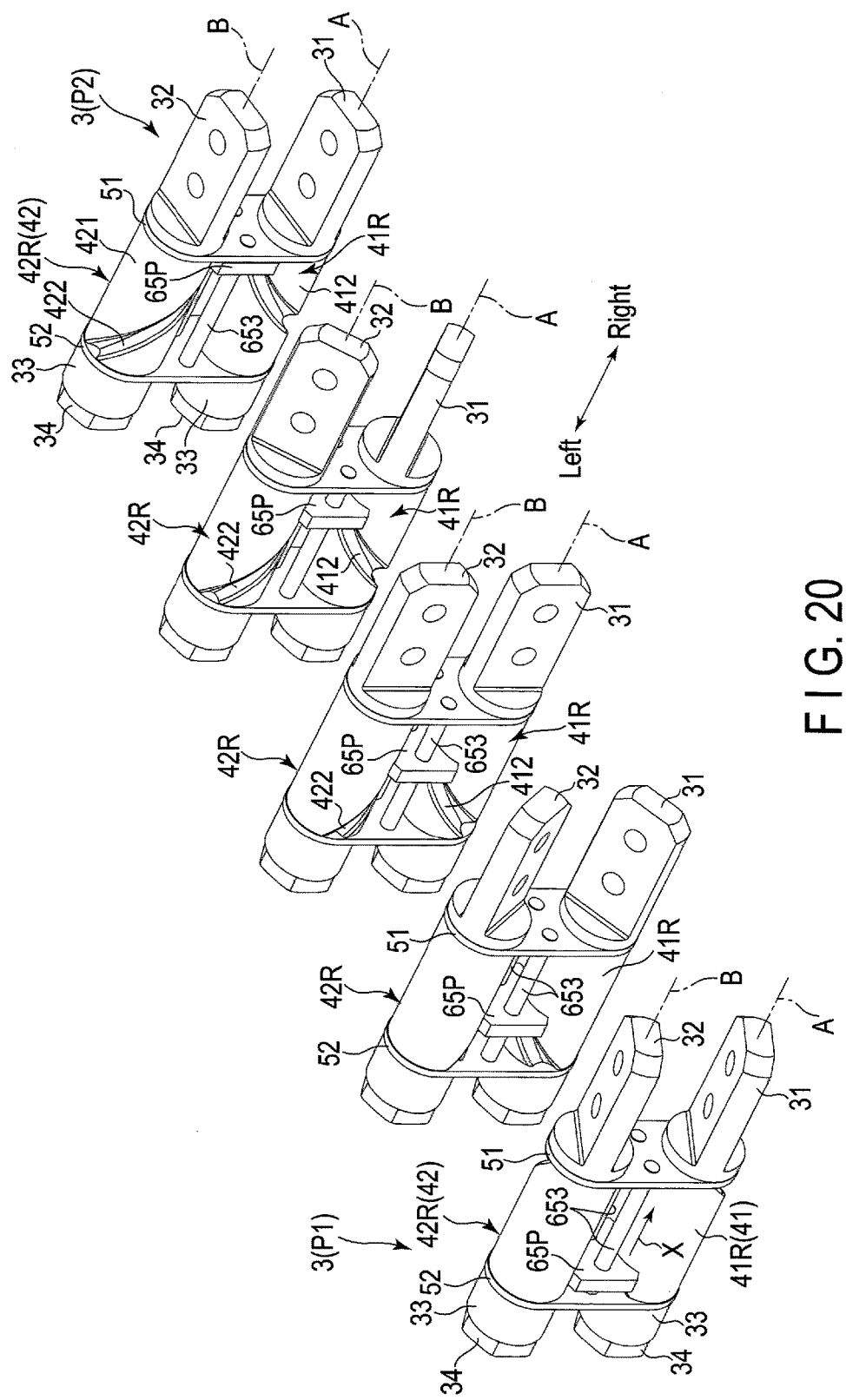
FIG. 20 is an exemplary perspective view illustrating movement of the hinge when the hinge of FIG. 18 is transformed from a first state to a second state of the electronic apparatus.

An electronic apparatus 1 according to the fifth embodiment will be explained with reference to FIG. 18 to FIG. 20. FIG. 18 is a perspective view of the hinge 3 disposed on the right side of the electronic apparatus 1 as viewed slantly from the left front to the right rear, and in a middle state between the first state P1 and the second state P2, that is, in a state where the first casing 21 and the second casing 22 extend along the same plane. The hinge 3 in the fifth embodiment includes a first cam roller 41R serving as the first rotation engaging portion 41, and a second cam roller 42R serving as the second rotation engaging portion 42, in the same manner as the hinge 3 of the fourth embodiment. The hinge 3 also includes a cam plate 65P serving as the transmission unit 6 to synchronize rotation angles of the cam rollers and disposed between the first cam roller 41R and the second cam roller 42R.

FIG. 19 is a schematic diagram in which the cylindrical surface 411 of the first cam roller 41R and the cylindrical surface 421 of the second cam roller 42R are developed. FIG. 20 illustrates the right hinge 3 of the electronic apparatus 1 as viewed from the right front, and illustrates a process in which the hinge 3 is transformed from the first state P1 illustrated in the left end in the drawing to the second state P2 illustrated in the right end in a stepped manner. In the fifth embodiment, the cylindrical surface 411 of the first cam roller 41R has the same external diameter as that of the cylindrical surface 421 of the second cam roller 42R, and a slope (pitch) Q1 of the spiral of the first spiral groove 412 and a slope (pitch) Q2 of the spiral of the second spiral groove 422 are set opposite and different from each other. In FIG. 19, the positions of zero degree indicate the state of FIG. 18 and the center state of FIG. 20. As illustrated in FIG. 19, the slope Q1 of the first spiral groove 412 is shallow (smaller in pitch) than the slope Q2 of the second spiral groove 422. In other words, the slope (pitch) Q2 of the spiral of the second spiral groove 422 is larger than the slope Q1 of the spiral of the first spiral groove 412. The cam plate 65P includes a projection 651 fitted into the first spiral groove 412, and a projection 652 fitted into the second spiral groove 422. The cam plate 65P is moved along guide rods 653 disposed in parallel with the first shaft 31 and the second shaft 32.

As illustrated in FIG. 19, the slope Q1 of the first spiral groove 412 is different from the slope Q2 of the second spiral groove 422. For this reason, the projections 651 and 652 engaged with the grooves are different in shape from each other. As illustrated in FIG. 19, because the slope Q1 of the first spiral groove 412 is shallow than the slope Q2 of the second spiral groove 422, when the cam plate 65P is moved in the X direction along the first shaft 31 and the second shaft 32, the rotation angle of the first cam roller 41R is larger than rotation angle of the second cam roller 42R. Specifically, when the electronic apparatus 1 is transformed from the first state P1 to the second state P2 or conversely, the rotation speed of the first cam roller 41R is faster than the rotation speed of the second cam roller 42R.

According to the fifth embodiment, when the electronic apparatus 1 is transformed from the first state P1 to the second state P2 or conversely, the first cam roller 41R is rotated by 90° or more based on zero degree, while the second cam roller 42R is rotated by less than 90° based on zero degree, as illustrated in FIG. 19. As a result, the first cam roller 41R and the second cam roller 42R are set with respect to the cam plate 65P, such that the first casing 21 makes an acute angle with the line segment C connecting the center A of the first shaft 31 with the center B of the second shaft 32 in the radial direction, and the second casing 22 makes an obtuse angle with the line segment C, in either of the first state P1 and the second state P2 of the electronic apparatus 1.

The X direction in FIG. 19 indicates a direction going from the friction portion 33 toward the plates 311 and 321. As illustrated in FIG. 20, with rotation of the first cam roller 41R and the second cam roller 42R, the cam plate 65P located at the friction portion 33 side in the first state P1 is moved to the plates 311 and 321 side in the second state P2. The cam plate 65P includes the projection 651 matching the first spiral groove 412 and the projection 652 matching the second spiral groove 422, and their slopes Q1 and Q2 are constant respectively. This structure enables linkage of the state in which the rotation angle of the first cam roller 41R is larger than the rotation angle of the second cam roller 42R.

The electronic apparatus 1 structured as described above according to the fifth embodiment enables linkage of the rotation angles of the first shaft 31 and the second shaft 32 with respect to the housing 5, because the cam plate 65P is fitted into the first spiral groove 412 of the first cam roller 41R and the second spiral groove 422 of the second cam roller 42R, when the second casing 22 is rotated by 360° with respect to the first casing 21 from the first state P1 to the second state P2. In addition, since the cam plate 65P is guided with two guide rods 653, is prevented inclination or twist, and enables stable operations.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first casing comprising a first surface and a second surface opposite to the first surface;
a second casing comprising a third surface and a fourth surface opposite to the third surface; and
a hinge coupling the second casing with the first casing continuously rotatably from a first state in which the first casing and the second casing are superimposed with the third surface caused to face the first surface to a second state in which the first casing and the second casing are superimposed with the fourth surface caused to face the second surface, wherein
the hinge comprises:
a first shaft fixed to the first casing;
a first cam roller including a first spiral groove in a first cylindrical surface of the first cam roller parallel with the first shaft;
a second shaft fixed to the second casing;
a second cam roller including a second spiral groove in a second cylindrical surface of the second cam roller parallel with the second shaft, an external diameter of the second cylindrical surface being larger than an external diameter of the first cylindrical surface, the second spiral groove being arranged in a direction opposite to a direction of the first spiral groove;
a housing holding the first shaft and the second shaft in parallel; and
a cam plate movable in a direction along centers of the first shaft and the second shaft, the cam plate being fitted into the first spiral groove and the second spiral groove, to synchronize rotation angles of the first cam roller and the second cam roller,
wherein a first slope of the first spiral groove of the first cam roller is shallower than a second slope of the second spiral groove of the second cam roller.

2. The electronic apparatus of claim 1, wherein the cam plate is moved and guided along two guide rods disposed in parallel with the first shaft and the second shaft.

3. The electronic apparatus of claim 1, wherein the first cam roller is rotated positively or negatively by 90° or more based on 0°, and the second cam roller is rotated positively or negatively by less than 90° based on 0°.

4. The electronic apparatus of claim 1, wherein when the electronic apparatus is moved from the first state to the second state, or from the second state to the first state, a first rotation speed of the first cam roller is faster than a second rotation speed of the second cam roller.

5. An electronic apparatus comprising:
a first casing comprising a first surface and a second surface opposite to the first surface;
a second casing comprising a third surface and a fourth surface opposite to the third surface; and
a hinge coupling the second casing with the first casing to reside in either a first state in which the first casing and the second casing are superimposed with the third surface of the second casing facing the first surface of the first casing or a second state in which the first casing and the second casing are superimposed with the fourth surface of the second casing facing the second surface of the first casing, wherein
the hinge comprises:
a first shaft coupled to the first casing,
a first cam roller including a first spiral groove in a first cylindrical surface of the first cam roller,
a second shaft coupled to the second casing;
a second cam roller including a second spiral groove in a second cylindrical surface of the second cam roller, an external diameter of the second cylindrical surface being larger than an external diameter of the first cylindrical surface;
a cam plate movable in a direction along the first shaft and the second shaft, the cam plate being fitted into the first spiral groove and the second spiral groove,
wherein a first slope of the first spiral groove of the first cam roller is shallower than a second slope of the second spiral groove of the second cam roller.

6. The electronic apparatus of claim 5, wherein the cam plate is moved and guided along a plurality of guide rods disposed in parallel with the first shaft and the second shaft.

7. The electronic apparatus of claim 5, wherein the first cam roller is rotated positively or negatively by 90° or more based on 0°, and the second cam roller is rotated positively or negatively by less than 90° based on 0°.

8. The electronic apparatus of claim 5, wherein when the electronic apparatus is moved from the first state to the second state, or from the second state to the first state, a first rotation speed of the first cam roller is faster than a second rotation speed of the second cam roller.

9. The electronic apparatus of claim 5, wherein the cam plate being moveable in a direction along centers of the first shaft and the second shaft, the cam plate being fitted into the first spiral groove and the second spiral groove, to synchronize rotation angles of the first cam roller and the second cam roller.

* * * * *